United States Patent Office 3,468,622
Patented Sept. 23, 1969

3,468,622
PROCESS FOR RECOVERING RARE EARTH METAL VALUES
Harvey Pobiner, Princeton, N.J., assignor to American Can Company, New York, N.Y., a corporation of New Jersey
No Drawing. Filed June 14, 1967, Ser. No. 645,896
Int. Cl. C22b 59/00
U.S. Cl. 23—22                 9 Claims

ABSTRACT OF THE DISCLOSURE

A method for recovering europium oxide from a mixture containing same by acidifying such a mixture in an aqueous medium and complexing the thereby produced europium salt with a dipolar aprotic solvent such as dimethylformamide, dimethylsulfoxide, dimethylacetamide and hexamethylphosphoramide to form a soluble europium salt complex. The remaining solids are separated from the mixture. Thereafter, the europium complex is decomposed by alkalinizing the solution to redeposit the europium in its oxide form.

---

This invention relates to achieving recovery of one or more rare earth metal values from mixtures containing same.

It will be appreciated that the rare earth compounds are well named in that they are rare, indeed, and therefore quite expensive. The matter is doubly compounded by the face that the rare earth salts are either found in combination in nature or used in combination so that they are separated with difficulty, since they possess relatively similar reaction characteristics.

The general concept of the present invention relies on the recovery of europium oxide from rare earth mixtures, phosphors and photoresponsive matrices. Naturally, the remainder, after removal of the europium compound, may be used in further recovery techniques.

In carrying out the concept of the invention, the europium oxide is complexed after acidification, for instance, with hydrochloric acid, with a dipolar aprotic solvent such as dimethylformamide, dimethylsulfoxide, hexamethylphosphoramide and dimethylacetamide. By removing the undissolved solids by filtration and the like, the remaining filtrate contains the complexed europium compound. The key to the process of recovery of the europium oxide from the complex is achieved by rendering the system alkaline. The following equations apply:

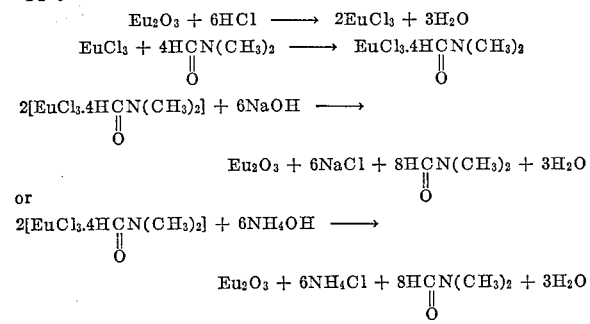

The specificity of europium oxide for the complexation shown in the above equations can be demonstrated in Table I. It will be seen that of the fifteen naturally occurring rare earth element oxides (elements Nos. 39, 57–60, 67–71), europium oxide is the only one that will complex with dimethylformamidehydrochloric acid system and produce a new ultraviolet spectroscopic result not shown by any of the individual reactants.

TABLE I.—SUMMARY OF THE REACTIONS OF THE RARE EARTH METALS IN A DIMETHYLFORMAMIDE (DMF)-HYDROCHLORIC ACID SYSTEM

| Rare earth metal | Atomic[1] No. | Oxide used | Result of HCl + DMF complexation |
|---|---|---|---|
| Yttrium | 39 | $Y_2O_3$ | Insoluble oxide. |
| Lanthanum | 57 | $La_2O_3$ | Homogeneous solution, no UV maximum. |
| Cerium | 58 | $CeO_2$ | Insoluble oxide. |
| Praseodymium | 59 | $Pr_6O_{11}$ | Do. |
| Neodymium | 60 | $Nd_2O_3$ | Homogeneous solution, no UV maximum. |
| Samarium | 62 | $Sm_2O_3$ | Do. |
| Europium | 63 | $Eu_2O_3$ | Homogeneous solution, UV maximum, 268 mu. |
| Gadolinium | 64 | $Gd_2O_3$ | Homogeneous solution, no UV maximum. |
| Terbium | 65 | $Tb_4O_7$ | Insoluble oxide. |
| Dysprosium | 66 | $Dy_2O_3$ | Homogeneous solution, no UV maximum. |
| Holmium | 67 | $HoO_3$ | Do. |
| Erbium | 68 | $Er_2O_3$ | Do. |
| Thulium | 69 | $Tm_2O_3$ | Insoluble oxide. |
| Ytterbium | 70 | $Yb_2O_3$ | Do. |
| Lutetium | 71 | $Lu_2O_3$ | Do. |

[1] Element 61, Promethium, is a radioactive decay product of uranium. Since it is not a naturally occurring rare earth metal, it was omitted from the investigation.

The recovery of europium oxide depends on the alkaline decomposition of the complex $EuCl_3$—DMF. Further, the degree of the decomposition is a function of alkalinity. Also, since the complex produces an ultraviolet absorption spectrum unique among the rare earth oxides, this spectrum serves as a measure of the complexed europium oxide in solution. As the pH is adjusted from 1.0 (the pH of the initially complexed solution) to pH 10.5 (the pH at which the $Eu_2O_3$ is completely out of solution), the intensity of the ultraviolet absorption maximum changes significantly. This is shown in Table II. It will be observed that it is necessary to reach a pH 10.5 for quantitative recovery of $Eu_2O_3$ when complexing with DMF.

TABLE II
[Recovery of $Eu_2O_3$ from Eu $Cl_3$—DMF as a function of pH]

| pH | UV absorption coefficient K 268 mu [1] | Percent $Eu_2O_3$ remaining as complex in solution |
|---|---|---|
| 1.0 | 2.520 | 100 |
| 2.0 | 2.326 | 92.3 |
| 3.5 | 1.152 | 45.7 |
| 6.9 | 0.953 | 37.8 |
| 9.2 | 0.129 | 5.1 |
| 11.2 | 0.000 | 0.0 |

[1] K=Absorbance at 268 mu/(conc. in g./liter) (cell length in cm.)

The instant process is useful in recovering europium oxide from a mixed rare earth phosphor, such as a europium oxide-activated yttrium oxide phosphor. In this process, the yttrium oxide is isolated in a separate fraction and recovered for subsequent reuse.

Further, recovery of europium oxide from host lattices is possible such as zinc oxide, aluminum oxide, barium titanate and sodium borate.

While the processes as set forth in the examples have a unifying thread running therethrough, the methods are not completely identical. Some changes should be made to take into account the material for salvage. Of course, fundamental in each example is the conversion of the europium oxide to its salt and the complexation with a dipolar aprotic solvent, usually carried out at room temperature. When adjusted to pH 10.5, the europium oxide fluocculates and is recovered by filtration and the like. In those instances when yttrium is present in the to-be-treated mixture, a mixed oxide fraction is recovered at pH 6.5, prior to an alkalinization to pH 10.5. This results in a cleaner separation of the two rare earth oxides. On the other hand, the insolubility of terbium oxide, $Tb_4O_7$, allows for complete separation from the recovered $Eu_2O_3$ and a single pH 10.5 fraction suffices for recovery. Europium oxide is similarly separated from a barium titanate ceramic and from an alumina matrix which are initially ground into powder.

When zinc oxide matrix is involved, the separation of europium oxide is dependent on the use of ammonium hydroxide in separating out at a pH 10.5. Caustic cannot be used in such an instance as the zinc hydroxide formed is gelatinous which would contaminate the recovered $Eu_2O_3$. By using ammonium hydroxide, the problem is obviated.

While usually the most efficacious acid is hydrochloric acid, other mineral acids are applicable such as sulfuric and nitric. Furthermore, the acid selected should not attack the dipolar aprotic solvent. Some organic acids, such as acetic acid, are applicable in carrying out the acidulation step.

The amount of the dipolar aprotic solvent to be most efficient is about four moles to every mole of theoretically available europium value. Of course, if one or more of the other rare earth values, such as in the case of yttrium compound, is to be complexed, followed by distinct alkalinization steps, it will be necessary to take into account the overall quantity of the dipolar aprotic solvent necessary.

The following examples are set forth to give further illustration of the concepts of the present invention.

Example I

This example is presented to illustrate the concept of the present invention in regard to the separation of europium oxide from a phosphor containing both yttrium oxide and europium oxide. The separation is predicated on the relative insolubility of the yttrium oxide in a dimethylformamide-hydrochloric acid solvent system that selectively complexes the europium oxide.

In carrying out the example, for each gram of the $Y_2O_3$—$Eu_2O_3$ phosphor, the following are added to the reaction vessel: 25 ml. dimethylformamide, 5 ml. of 15% wt./vol. sodium chloride aqueous solution, 3 ml. of 37% hydrochloric acid, and 10 ml. of distilled water. The resultant mixture is stirred for two hours. The undissolved material is yttrium oxide and the former europium oxide is in solution as the europium chloridedimethylformamide complex.

The mixture is filtered to thereby remove the undissolved materials. The filtrate which contains the complex, and a relatively small quantity of yttrium oxide, is adjusted in pH to 6.5 with 10% solution of sodium hydroxide. The resultant is heated to encourage the formation of a filterable precipitate which is the remaining yttrium oxide and a small quantity of $Eu_2O_3 \cdot 6H_2O$.

The initial $Y_2O_3$ fraction separated represents 86% of the original $Y_2O_3$ in the mixture, the remaining 14% $Y_2O_3$ is in the mixed oxide phase, that is, the precipitate produced when the pH is adjusted to 6.5, in the above. The final $Eu_2O_3$ fraction represents 89% of the original $Eu_2O_3$, with the remaining 11% of the $Eu_2O_3$ in the mixed oxide phase.

Example II

The present example deals with the separation of europium oxide from a mixture comprising terbium oxide and europium oxide.

The mixture of $Tb_4O_7$ and $Eu_2O_3$ is separated and recovered in a technique as in Example I, except that the intermediate alkalinization to the pH 6.5 level is not necessary due to the insolubility of $Tb_4O_7$ in the solvent system. It is only necessary to recover the $Tb_4O_7$ which remains soluble as the oxide while the $Eu_2O_3$ is not precipitated until the filtrate containing the complex is adjusted to a pH of 10.5. By this system, 96% of the original $Eu_2O_3$ is recovered and 97% of the original $Tb_4O_7$ is recovered.

Example III

In this example, europium as the oxide is recovered from a phosphor containing europium oxide and barium titanate.

The mixture is usually a ceramic matrix which must be ground into a powder. For each one gram of the ceramic powder in a 250 ml. beaker 25 ml. of dimethylformamide, 5 ml. of 15% wt./vol. solution sodium chloride and 3 ml. of 37% hydrochloric acid and 10 ml. of distilled water are added. The resultant is agitated for two hours at room temperature. Then the insolubles are filtered out. The solids represent barium titanate.

The filtrate is adjusted to a pH of 10.5 with 10% solution of sodium hydroxide in order to decompose the europium chloride-dimethylformamide complex. The europium oxide precipitates. The resultant mixture is heated to coagulate the europium oxide and is allowed to stand for about two hours.

The solids are then recovered by filtering and are then washed. These solids are dried at 200° C. for two hours and represent the recovered europium oxide as the hexahydrate. It is possible by this example to recover 97.8% of the barium titanate and 99% of the europium oxide.

Example III–A

In the foregoing it was stated that under some conditions an organic acid, such as acetic acid, would be effective as a mineral acid, such as hydrochloric acid.

To illustrate the efficacy of employing acetic acid, the procedure of Example III is utilized except that acetic acid in the same mole ratio is substituted for the hydrochloric acid. A 15% sodium acetate solution is substituted for the solution of sodium chloride. It is necessary to substitute a heating step at 95° C. for 30 minutes for the two-hour agitation period of Example III. It is also necessary to undertake a plurality of succesive recrystallizations to obtain a good yield of $Eu_2O_3$, that is, in this example 98.5%.

Due to the need for a heating step and requirement that several recrystallizations be undertaken before a satisfactory $Eu_2O_3$ yield is obtained, clearly the more useful acids will be the inorganic acids, such as hydrochloric acid.

Example IV

The method of this example is the same as in connection with Example III except that the mixture is $Eu_2O_3$–$Al_2O_3$ phosphors. By applying the method, 99.3% of the aluminum oxide is recovered and 91% of the europium oxide is recovered.

Examples V and VI

In this method, europium oxide is recovered from phosphors of calcium tungstate (Example V) and calcium molybdate (Example VI). The process is carried out as in Example III. In this separation, the tungstate is recoverable to a greater degree than is the molybdate. Between 89–94% of the original $Eu_2O_3$ is recovered from the molybdate and tungstate matrices after a single recrystallization.

Example VII

In this method, europium oxide is recovered from a zinc oxide matrix.

For each one gram of the zinc oxide matrix, the following are added: 25 ml. dimethylformamide, 5 ml. of 15% wt./vol. solution of sodium chloride, 3 ml. of 37% hydrochloric acid and 10 ml. of distilled water. The mixture is stirred for two hours at room temperature. A true solution is obtained. This solution is rendered alkaline to a pH of 10.5 with ammonium hydroxide. As a result, europium oxide flocculates and precipitates from the solution. By using ammonium hydroxide instead of the sodium hydroxide, the zinc stays in solution; with sodium hydroxide the zinc hydroxide forms a gelatinous precipitate.

After pH adjustment, the mixture is heated to below boiling and permitted to be in quiescent state for at least two hours. The solids are then recovered by filtration and washed with water. They are then dried at 200° C. for two hours and recovered as $Eu_2O_3 \cdot 6H_2O$. 92–95% recovery of the original europium oxide present is realized by employing this technique.

Examples VIII and IX

In this method, europium oxide is recovered from phosphors of cadmium sulfide (Example VIII) and zinc sulfide (Example IX). The process is carried out as in Example V, that is, the mixture is rendered alkaline with ammonium hydroxide. In other words, the zinc and cadmium remain in solution as the hydroxide and the europium oxide is liberated by alkaline decomposition of the europium complex. After recrystallization, between 89–91% of the original $Eu_2O_3$ is recovered from the phosphor.

Example X

The process of this example pertains to recovery of europium oxide from a soluble borate matrix. The separation of europium oxide from a matrix or glass of sodium borate is facilitated by the solubility of the sodium tetraborate in an alkaline medium and the recovery of $Eu_2O_3$ from the dimethylformamide complex at pH 10.5.

To each gram of the borate matrix to be treated, the following are added: 25 ml. dimethylformamide, 5 ml. of 15% wt./vol. solution of sodium chloride, 3 ml. of 37% hydrochloric acid and 10 ml. of distilled water. Inasmuch as the borate is soluble, a true solution results after a period of stirring. Then, the pH is adjusted to 10.5 with 20% solution of sodium hydroxide. The mixture is heated to boiling accompanied with stirring. After heating, the mixture is left to stand for at least two hours at room temperature. The solids are then recovered by filtration and washed. The washed solids are dried at 200° C. for two hours and recovered as $Eu_2O_3 \cdot 6H_2O$. 99% recovery of the original europium oxide is realized in using the technique of this example.

Example XI

In this example, a technique is illustrated for recovering europium oxide from a mixture of europium oxide and neodymium oxide.

The ligand dimethylsulfoxide is more efficacious in this example than the dimethylformamide. While both of these rare earth oxides form homogeneous solutions with dimethylsulfoxide-hydrochloric acid solvent system, the europium oxide can be recovered from its complex with dimethylsulfoxide-hydrochloric acid solvent system, the europium oxide can be recovered from its complex with dimethyl-sulfoxide-hydrochloric acid by adjusting the pH for alkaline decomposition to pH 8.0. At pH 8.0, most of the neodymium oxide does not flocculate nor precipitate from the solution. At pH 8.5, $Nd_2O_3$ begins to flocculate. By employing recrystallization techniques, the europium oxide may be purified.

Specifically, applying the instant technique, for each one gram of the $Eu_2O_3$–$Nd_2O_3$ mixture, the following are added: 25 ml. dimethylsulfoxide, 5 ml. of 15% wt./vol. solution of sodium chloride, 3 ml. of 37% hydrochloric acid and 10 ml. of distilled water. The mixture is heated until a relatively clear solution is presented. The solution is then cooled to room temperature and the pH is carefully adjusted with relatively dilute aqueous ammonium hydroxide to pH 8.0–8.1. As a result thereof, the europium oxide flocculates as the

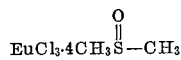

complex decomposes. The neodymium compound as its complex remains in solution. Thereafter, a mixture is heated to near boiling, allowed to stand at room temperature for two hours. At the end of this time, the solids are filtered out and are washed, prior to recrystallization, to purify the europium oxide which is present, after drying, as the hexahydrate.

In a mixture of $Eu_2O_3$–$Nd_2O_3$ (49.1%–50.9%, respectively), the first recrystallization produces a fraction of $Eu_2O_3$. Additional recrystallization is required to obtain greater purity.

The importance of selecting dimethylsulfoxide DMSO as the ligand over dimethylformamide (DMF) in effectively separating europium oxide from neodymium oxide is demonstrated in Table III:

TABLE III

| Oxide | Ligand | pH | Percent removed |
|---|---|---|---|
| $Eu_2O_3$ | DMF | 10.5 | 92–99% $Eu_2O_3$ |
| $Eu_2O_3$ | DMSO | 8.0 | 81% $Eu_2O_3$ |
| $Nd_2O_3$ | DMF | 8.0 | 27% $Nd_2O_3$ |
| $Nd_2O_3$ | DMSO | 9.4 | 87% $Nd_2O_3$ |
| $Nd_2O_3$ | DMSO | 8.0 | 8% $Nd_2O_3$ |
| 49.1% $Eu_2O_3$, 50.1% $Nd_2O_3$, mixture of Ex. XI. | DMSO | 8.0 | 73% of the original $Eu_2O_3$ |

The following table summarizes the above examples, clearly illustrating the efficacy of the instant invention.

TABLE IV

| Ex. | Mixture | Percent by weight | Percent $Eu_2O_3$ recovered | Percent remaining component |
|---|---|---|---|---|
| I | $Eu_2O_3/Y_2O_3$ | 29.4/70.6 | 88.8 | 85.8 |
| II | $Eu_2O_3/Tb_4O_7$ | 23.8/76.2 | 96.0 | 97.3 |
| III | $Eu_2O_3/BaTiO_3$ | 16.4/83.6 | 99.3 | 97.8 |
| IV | $Eu_2O_3/Al_2O_3$ | 18.6/81.4 | 90.7 | 99.1 |
| V | $Eu_2O_3/CaWO_4$ | 8.6/91.4 | ¹ 94.4 | 96.4 |
| VI | $Eu_2O_3/CaMoO_4$ | 9.3/90.7 | ¹ 88.8 | 62.2 |
| VII | $Eu_2O_3/ZnO$ | 9.1/90.9 | 92.5 | ² ZnO |
| VIII | $Eu_2O_3/CdS$ | 9.2/90.8 | ¹ 88.7 | ² CdS |
| IX | $Eu_2O_3/ZnS$ | 10.6/89.4 | ¹ 90.6 | ² ZnS |
| X | $Eu_2O_3/Na_2B_4O_7$ | 15.9/84.1 | 99.0 | ² $Na_2B_4O_7$ |
| XI | $Eu_2O_3/Nd_2O_3$ | 49.1/50.9 | ¹ 73.0 | ² $Nd_2O_3$ |

¹ Recrystallization.
² Not recovered.

It has also been found that europium oxide may be separated from a mixture containing scandium oxide. While scandium is not a rare earth metal, it is usually found in association with rare earth values. The scandium oxide does not complex with dipolar aprotic solvents in the presence of acid so that it belongs to groups that are in the insoluble oxide conditions of the process.

It will be apparent that many changes and modifications of the several features described herein may be made without departing from the spirit and scope of the invention. It is therefore apparent that the foregoing description is by way of illustration of the invention rather than limitation of the invention.

I claim:
1. A process for recovering europium oxide from matrices containing europium oxide and at least one material selected from the group consisting of rare earth compounds, phosphors and photoresponsive materials comprising treating the matrix with an acid solution selected from the group consisting of mineral acids and acetic acid, adding a dipolar aprotic solvent selected from the group consisting of dimethylformamide, dimethylsulfoxide, dimethylacetamide and hexamethylphosphoramide to form a solubilized europium salt complex, separating undissolved solids from the solution, increasing the pH value of the solution to at least 6.5 by adding an alkaline solution selected from the group consisting of an alkali metal hydroxide and ammonium hydroxide to precipitate a major proportion of the europium as europium oxide from the soluble salt complex and removing said precipitate.

2. A process as claimed in claim 1 in which the acid solution is hydrochloric acid.

3. A process as claimed in claim 1 in which the dipolar aprotic solvent is dimethylformamide.

4. A process as claimed in claim 1 in which the acid solution is hydrochloric acid and the dipolar aprotic solvent is dimethylformamide.

5. A process as claimed in claim 1 wherein the pH value of the solution containing the europium salt complex is increased to 10.5.

6. A process as claimed in claim 1 wherein the matrix includes a zinc compound and wherein the alkaline solution is ammonium hydroxide.

7. A process as claimed in claim 1 wherein the matrix includes neodymium oxide, the acid is a mineral acid and the dipolar aprotic solvent is dimethylsulfoxide, and wherein the pH value of the acidic solution is increased to about 8.0 to precipitate a major proportion of the europium as europium oxide, separating the europium oxide, and subsequently increasing the pH of the solution to 8.5 to precipitate neodymium oxide.

8. A process as claimed in claim 7 wherein the mineral acid is hydrochloric acid.

9. A process as claimed in claim 1 in which the acid solution is acetic acid and further comprising the step of heating the reaction mixture to about 95° C. prior to separating undissolved solids and subsequently subjecting the final europium oxide precipitate to successive recrystallizations for improving the yield of europium oxide.

References Cited

UNITED STATES PATENTS

| | | | |
|---|---|---|---|
| 3,049,403 | 8/1962 | Krumholz | 23—22 |
| 3,077,378 | 2/1963 | Peppard et al. | 23—23 |
| 3,089,758 | 5/1963 | Kruesi | 23—22 X |
| 3,089,759 | 5/1963 | Bronaugh et al. | 23—22 X |
| 3,092,449 | 6/1963 | Bril et al. | 23—22 |
| 3,153,571 | 10/1964 | Bronaugh | 23—22 |

HERBERT T. CARTER, Primary Examiner

U.S. Cl. X.R.

23—23, 24, 183; 260—429.2